United States Patent [19]

Meyer-Bosse

[11] Patent Number: 4,650,093
[45] Date of Patent: Mar. 17, 1987

[54] APPARATUS FOR SEPARATING AND DISTRIBUTING GRANULAR GOODS

[75] Inventor: Jürgen Meyer-Bosse, Munich, Fed. Rep. of Germany

[73] Assignee: Karl Becker GmbH u. Co. KG Maschinenfabrik, Oberweser, Fed. Rep. of Germany

[21] Appl. No.: 736,676

[22] Filed: May 22, 1985

[30] Foreign Application Priority Data

May 28, 1984 [DE] Fed. Rep. of Germany ....... 3419951
May 28, 1984 [DE] Fed. Rep. of Germany ....... 3416181

[51] Int. Cl.⁴ .............................................. A01C 7/04
[52] U.S. Cl. ..................................... 221/233; 111/77; 221/266; 221/278
[58] Field of Search ............... 221/211, 233, 266, 278; 111/77, 78

[56] References Cited

U.S. PATENT DOCUMENTS

| Re. 29,393 | 9/1977 | Becker | 221/211 |
| 1,331,235 | 2/1920 | Bristow | 221/211 |
| 3,240,175 | 3/1966 | Clow | 221/211 X |
| 3,387,746 | 6/1968 | Whipple | 221/211 |

FOREIGN PATENT DOCUMENTS 91940 10/1961 Denmark ........................... 111/77

Primary Examiner—F. J. Bartuska
Attorney, Agent, or Firm—Jordan and Hamburg

[57] ABSTRACT

Apparatus for separating and distributing granular goods includes a housing and a bucket wheel rotatable in the housing, the bucket wheel having an outer receiving side and an inner side along with a plurality of spaced-through holes extending between the inner side and the receiving side. An intake on the housing supplies granular goods to the receiving side of the bucket wheel and a discharge on the housing discharges the granular goods from the housing, the discharge being circumferentially spaced from the intake. An ejector is disposed within the bucket wheel and faces the inner side of the bucket wheel while a conduit supplies compressed air to the ejector, the ejector having a compressed air outlet directed toward the inner side of the bucket wheel such that the compressed air passing through the outlet acts on the through holes during rotation of the bucket wheel.

17 Claims, 9 Drawing Figures

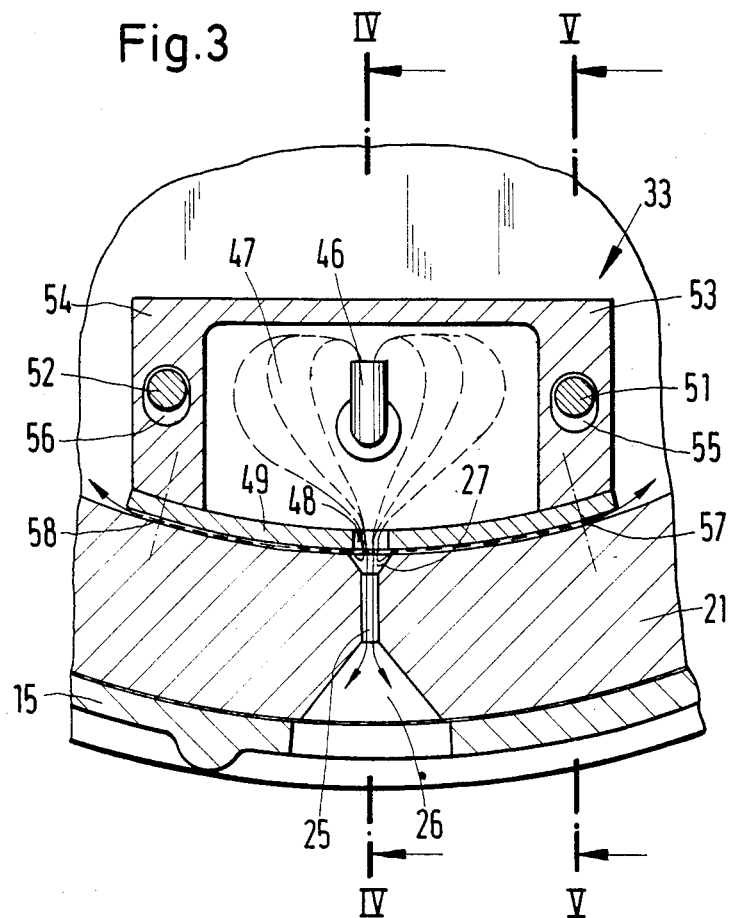
Fig. 3
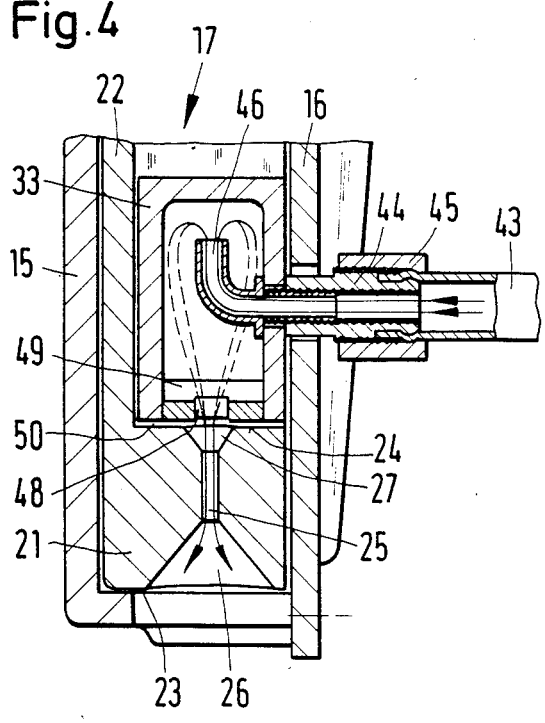
Fig. 4
Fig. 5

APPARATUS FOR SEPARATING AND DISTRIBUTING GRANULAR GOODS

The invention relates to an apparatus for separating and distributing granular goods.

Apparatus of this kind have been developed particularly in view of reliably separating bulk-fed grains under utilization of mechanical and particularly pneumatic means, for instance, of an air jet applied to the receiving side or of a vacuum applied to the backside of a bucket wheel.

The problem of exact individual filling of the bucket wheel has been solved, but what needs to be solved now is the less obvious but no less critical problem of ejecting in a reliable and clean way. An ejection apparatus which has proven to be reliable for the purpose of separating maize kernels is provided with a blade engaging into a groove extending from the backside (inner circumference) of the bucket wheel to close to the receiving side, the blade being supported in the housing, and pushing the consecutively passing kernels individually out of the recesses while the bucket wheel is rotating. If the maize kernels are sufficiently uniformly thick, round and smooth-walled, satisfactory results are obtained in practical applications, even though the ejection blade causes rub-off on the kernels and on the wheel, which gets clogged as soil gets in the openings and the groove of the bucket wheel and thus leads to operating problems. Even in a tight construction, the groove itself interferes with the pneumatic separation, because it results in secondary openings.

The above mentioned deficiencies of the known ejector becomes serious when smaller, more irregular and less smooth-walled kernels have to be worked with. With any further reduction in size of the ejector groove and of the ejector, there immediately result higher production costs and mechanical problems leading to the greatest difficulties because of soiling and thus causing short intervals between maintenance and failure susceptibility. In its construction and adjustment, smallest tolerances have to be observed. When the bucket wheel is changed in such an apparatus, it is also necessary to change and adjust a fitting ejector.

An object of the invention is to provide an apparatus for separating and distributing granular goods which allows reliable ejection without interfering with kernel separation in a strong working operation requiring little service even when relatively small, irregularly shaped, soft or rough-walled kernels are used.

With the solution according to the present invention, it is possible to apply compressed air from the backside of the bucket wheel and to apply it targeted on the bucket wheel's through-hole which is in the ejection position in order to loosen and eject the individual kernel supported on the other side in the recess. Thereby, it is especially advantageous that with the outlet of the ejector head, thrusts of compressed air, and thus static energy, act for at least a short time upon the support of the individual kernal, whereas a pure jet blast stream of air would easily be deactivated on the backside of the bucket wheel and the through-hole because of turbulences and reflections.

Such an ejection apparatus renders conventional mechanical ejectors obsolete. Because the known ejectors could only be scaled down to a certain limit, it led to a search for new solutions which, however, had disadvantages because of their frictional stress on the bucket wheel and their susceptibility to soiling.

In particular, the disadvantageous groove for the ejector tool, which is disadvantageous with respect to its susceptibility to soiling, on the one hand, and the aerodynamic interference it causes at the through-holes, on the other hand, is no longer needed. The through-holes can now suitably be provided with simple, in particular, round and closed cross-sections, in order to convey the compressed air from the ejector preferably from the inside to the kernel. This simplified shape of the through-holes also eliminates susceptibility to jamming, which previously seemed to be unavoidable with the ejector groove.

It proved to be especially advantageous not to connect the ejector head in a pressure determined way to a seal dragging on the bucket wheel, but rather to leave at least a minimum air slit which is stabilized by an air cushion effect, and which, just as with an air suspension, allows a practically frictionless bucket wheel movement with respect to the ejector head.

Such an air slit also makes it possible to throw out soil particles. When the machine is being filled with kernels, individual particles unavoidably enter into the recesses intended for receiving the individual kernels, and into the through-holes. This caused regular maintenance costs for the conventional apparatus, but it is now eliminated because of the blowing out and the resulting cleaning of the through-holes and the recesses. If such soil still reaches the backside of the bucket wheel, the air slit between the ejector head and the bucket wheel causes the loose particles to become separated and removed, thus performing an on-going cleaning of the bucket wheel. In contrast, the conventional mechanical dragging ejectors caused dirt and waste particles to become ground in.

Because the air slit between the ejector head and the bucket wheel does not constantly contain compressed air, but rather receives bursts of compressed air and in-rushes of pressure in connection with the ejection of kernels, there results an increased cleaning effect. Because the ejector head is movably arranged with a certain amount of play of movement in a direction towards the bucket wheel and at a distance thereof, the bursts of compressed air and vibrations can be further increased. The ejector head is pressed by its own weight, or if necessary, also by the pressure of a spring, towards the bucket wheel and is arranged on a resilient air cushion. By means of suitable stops, it is appropriately assured that the ejector head does not quite make contact or cause friction against the bucket wheel, but instead maintains a minimum remaining air slit. The movable ejector head, in reaction to the fluctuations of the compressed air of the air cushion, then executes reaction movements and oscillations towards the bucket wheel, thus increasing the removal of soil particles.

Further characteristics and advantages of the present invention result from the claims and the following description, in which a preferred embodiment of the object of the invention will be further explained with regard to the drawings.

BRIEF DESCRIPTION OF THE DRAWINGS

FIG. 3 is an enlarged cross-sectional view of a detail III in FIG. 2;

FIG. 4 is a view along line IV—IV in FIG. 3;

FIG. 5 is a view along line V—V in FIG. 3;

DESCRIPTION OF THE PREFERRED EMBODIMENTS

Figure 1:
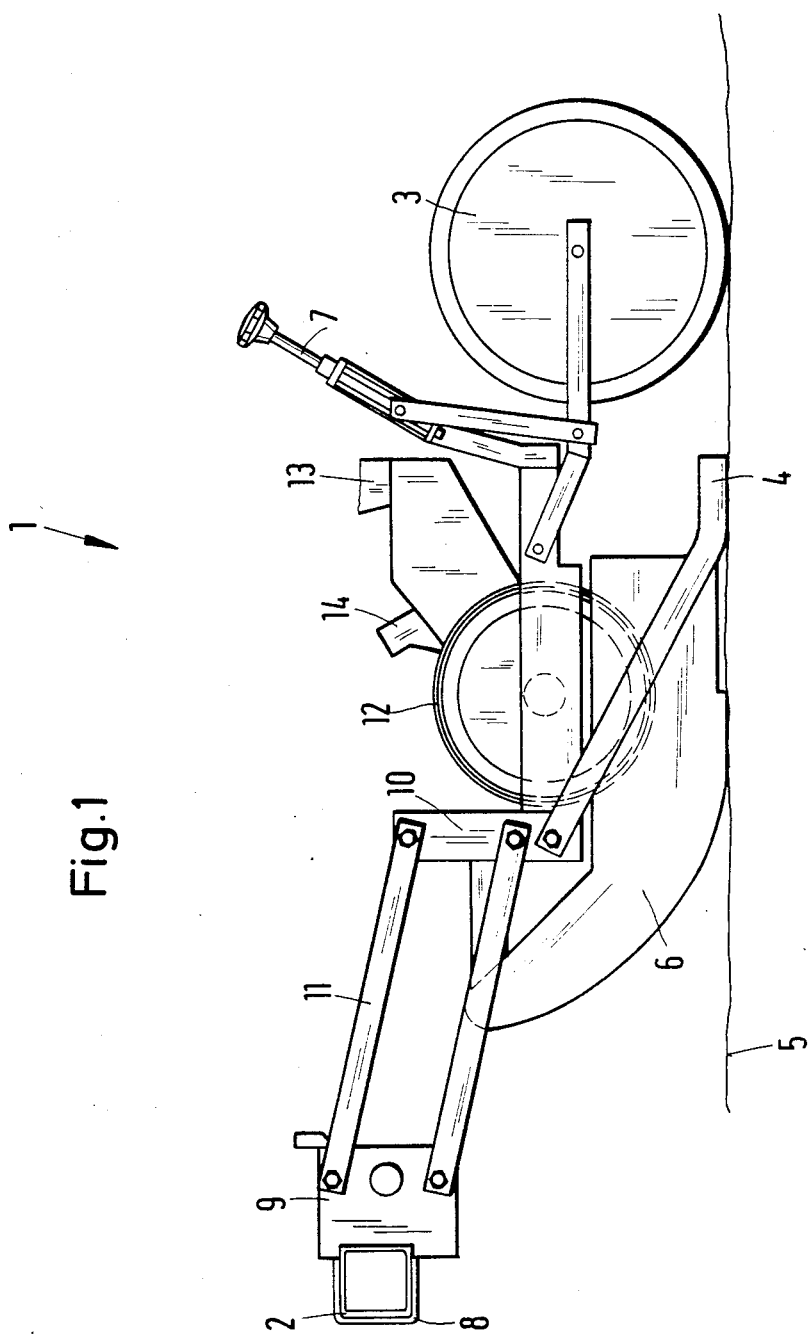
FIG. 1 is a simplified total view of a sowing unit of a single-kernel sowing machine.

In FIG. 1 is illustrated a sowing unit 1, which is designated overall as 1, of a single-kernel sowing machine, which typically can be a sowing unit having several parallel sowing units which are separably and changeably clamped on at a desired row distance on a main beam 2 of a single-kernel sowing machine. It supports itself independently on the ground level, which is indicated at 5, by means of a seed pressure roller 3 and a closing blade 4, whereas a sowing blade 6, which is rigidly connected to the pressure roller and closing blade 4, preceeds it penetrating the soil and adjusting with its cutting depth the depositing depth of the seeds to be sown, whereby the penetration depth is adjustable via a spindle 7 towards the support of the pressure roller 3.

Because the main frame 2, which normally is guided by a tractor or another vehicle which has a hinge 9 clamped thereon via a U-bolt 8, does not follow the ground level of the pressure roller 3, between the hinge 9 and a machine girder 10 which is rigidly connected to the sowing blade 6, there is provided a parallelogram guide 11 which is interconnected therebetween and which readjusts the sowing unit 1 heightwise.

Figure 2:
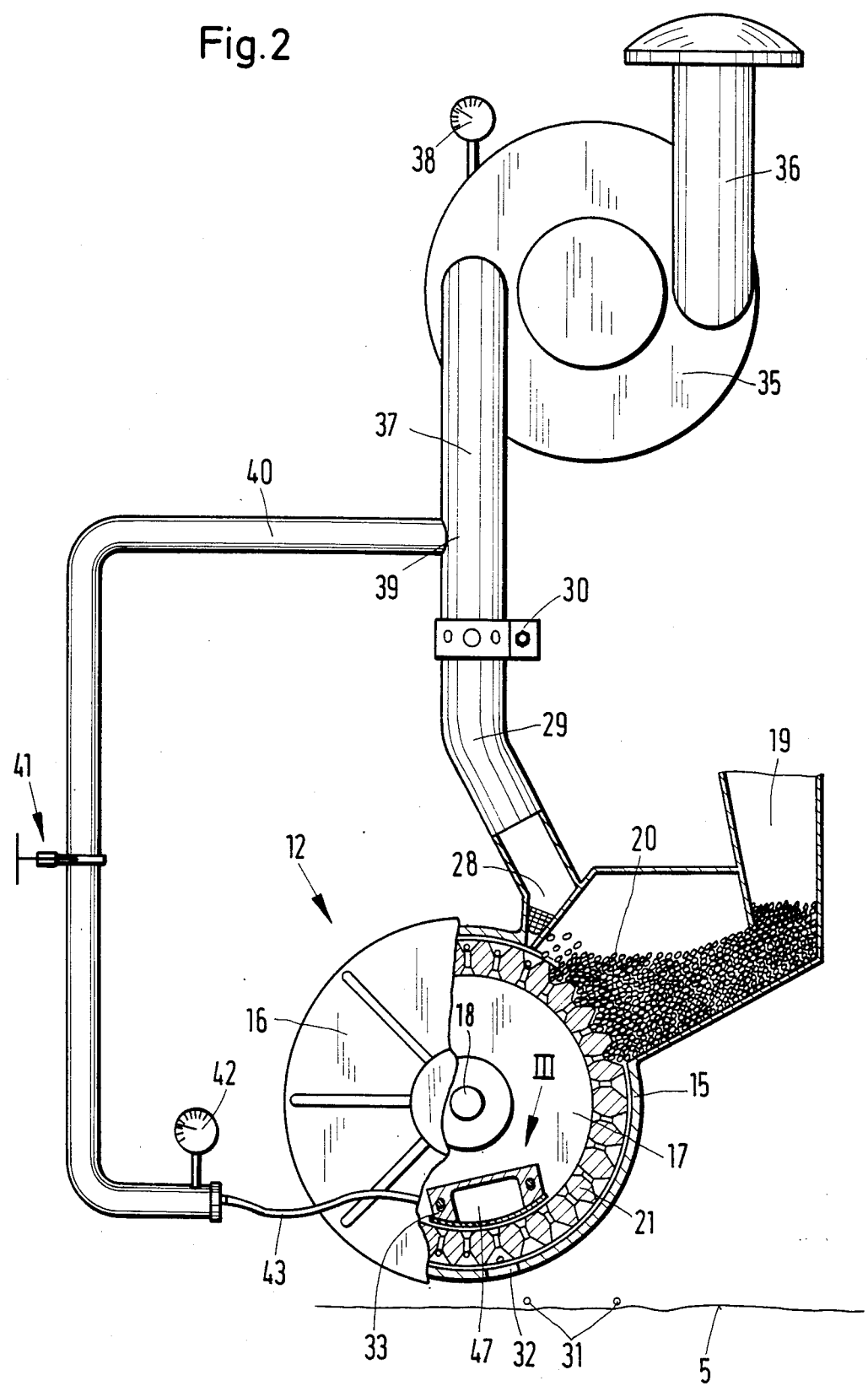
FIG. 2 is an enlarged, partial cross-sectional view of the sowing unit.

To the machine girder 10 are fixedly connected a bucket wheel housing 12, a seed housing 13 and a air intake 14, which will be further discussed with regard to FIG. 2, which will also further illustrate the embodiment according to the present invention, whereas FIG. 1 essentially illustrates characteristics which are already known.

FIG. 2. illustrates (as a partial cross-sectional view of) the bucket wheel housing 12 and the functionally assigned separating and distributing means. The bucket wheel housing 12 comprises a housing shell 15 and a housing cover 16 which encloses a cylindrical inner space, inside which a bucket wheel 17 can rotate around an axis 18 arranged horizontally and at a right angle to the direction of movement of the sowing unit. The drive (not illustrated) of the bucket wheel can be of conventional design, being suitably synchronized with the movement of the sowing unit with reference to the ground.

The seed-grains are fed as a chargeable mass, which has to be separated, from a seed-grain housing 19 through a perforation in the ring wall of the housing shell 15 to the bucket wheel 17. For this purpose, it essentially consists of a rim-like wheel portion 21, which is supported on one side by a flat wheel disk 22 in the area of the axis 18 of the bucket wheel housing 12, i.e., its housing shell 15. Thus the bucket wheel 17 is provided with a broadened circumferential edge as a receiving side 23 and an opposite inner circumferential edge as a backside 24, between which, distributed over the circumference through-holes 25 radially extend from the outside to the inside at a given angle distance. The through-holes 25 open on the outside into a bucket or grain chamber 26 for receiving a single seed grain.

The grain chamber 26 has the basic shape of a conically tapered recess extending from the receiving side 23 towards the inside up to the through-hole 25. Towards the backside 24, the through-hole 25 also opens into a sunk conical recess 27.

This embodiment of the bucket wheel can be used in a known way for the separation of seed grains, whereby excess seed grain trickling from the grain chamber 19 into the grain chambers is blown out by means of a nozzle 28 so that only a single grain is left, which keeps the through-hole opening 25 covered and deflects the stream of blowing air (for the other grains) in an upward direction, whereas the seed grain itself remains held down due to its position in the cavity. The supply of blowing air takes place via a conduit 29 in an adjustable way by means of a throttle valve 30. According to the view in FIG. 2, the seed grains are separated into one grain per grain chamber, and travel with the bucket wheel rotating inside the bucket wheel housing 12 counter-clockwise over more than one half of a revolution, i.e., more exactly, approximately by an angle of 210° and are then to be ejected through an opening 32 in the housing shell 15 at the given distance like the grains 31 of FIG. 2.

In FIGS. 3 to 5, there is illustrated in greater detail an ejection apparatus with an ejector head 33, enclosing on the inside a chamber 47 to which compressed air is applied, and which serves for this purpose.

The compressed air is produced in a compressor device 35 having an intake conduit 36 and pressure conduit 37, the compressed air being monitored by a gauge 38. The conveying capacity is apportioned in such a way that it can simultaneously also supply the already mentioned nozzle 28 on the intake side of the bucket wheel 17. Starting at a conduit intersection 39, initially there is a rigid compressed air conduit 40 having an adjustable throttle valve 41 and a gauge 42 indicating the set pressure value behind the throttle valve, and subsequently a flexible (hose) conduit 43 extending through the cover 16 of the bucket wheel housing 12 to a plug-in nipple 44 fastened on the ejector head 33, the conduit 43 being fastened on the plug-in nipple 44 with the help of a hose clamp 45.

The plug-in nipple 44 changes over into an upwardly bent feed conduit 46 which extends through the wall of the ejector head 33 into the inner chamber 47 thereof. As can be seen in FIG. 5, with respect to the cover 16, the plug-in nipple has some play of movement at least on the top and on the bottom, so that movability in a vertical direction is not hindered by the conduit for the compressed air.

The applied compressed air is dammed up and distributed in the inner chamber 47, wherein the intake flow directed at right angles against the upper wall of the inner chamber 47 suppresses the formation of standing turbulences. The exit of the compressed air out of the inner chamber 47 takes place via an outlet 48 in a bottom plate 49 of the ejector head 33. This bottom plate is bent like a skid in order to attain an extensive adaptation to the circular cylinder arc of the backside 24 of the bucket wheel 17. Thus an air slit 50 is made possible between ejector head 33 and the backside 24 of the bucket wheel, where air can enter through the outlet 48. There results a practically frictionless air suspension with an air cushion effect so that, due to its own weight, the downward tending ejector head 33 "hovers" as an air cushion shuttle over the bucket wheel 17.

The outlet 48, however, also lies in the same axial plane as the through-holes 25 in the bucket wheel. As the through-holes pass the outlet 48 sequentially during the rotation of the bucket wheel, they make a short-term connection with the compressed air which is also being conveyed to the top of the through-hole 25 via the cone bore 27. Because of the relatively large outlet 48, the compressed air reaches the grain chamber 26 at a small decrease of pressure, in order to loosen there any grain which might have become stuck or which is sticky, and to eject it. The burst of air pressure is decreased during loosening of the grain, and consequently, there obviously does not occur any mentionable pressure build-up over the grain which has already been lying loosely in the grain chamber 26, the through-hole 25 in conjunction with intake cone 27 and diffusion cone—grain chamber 27 subsequently acting with acceleration and pressure recovery like a venturi tube.

Reliable and exact ejection is made possible in every case without concurrently mechanically stressing the grain and, in particular, without having to provide the ejector apparatus with ejectors with dragging mechanical parts susceptible to soiling and friction extending from the backside of the bucket wheel into the grain chamber. By contrast, the through-hole 25 is of a simple shape which is not only desirable for ejecting but also for separating.

The entire bucket wheel receives simultaneously an automatic cleaning. A considerable portion of rub-off, dust, and grain particles which enter with the grain into the grain chambers 26 and from there enter into the through-hole are blown out with the blast of air pressure of the ejector. Those particles which enter nonetheless deeper into the inside of the bucket wheel, i.e., particularly on the backside 24, are not ground in by mechanical parts of the ejector, but are blown out in circumferential direction until they reach the outside via one of the through-holes 25.

Thereby it is also advantageous that the state of suspension of the air cushion of the ejector head 33 is not uniform, but already in reaction to the blast of air pressure of the ejector also encompasses its own oscillations, which in turn again leads to blasts of air pressure in the air slit 50, thus increasing its cleaning function. In order to make it possible for the ejector head to perform the required movements, it is arranged so that it has sufficient play with respect to the cover 16. At a right angle to the direction of movement of the bucket wheel, two head-bolts 51 and 52 traverse the side walls 53 and 54 of the ejector head 33 through the bores 55, 56, leaving for the ejector head a considerable play of movement, especially in a vertical direction. This play of movement, however, is limited in the downward direction so that the ejector head 33 cannot make frictional contact with the bucket wheel 17. From the side of the conduit of compressed air, the movability is provided by the flexibility of the hose 43.

Figure 6:
FIG. 6 is a side view of a bottom plate of an ejector head.
Figure 7:
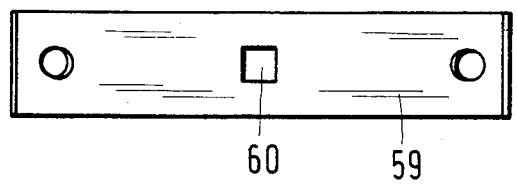
FIGS. 7, 8 and 9 are top views of various bottom plates of ejectors having side views as shown in FIG. 6.
Figure 8:
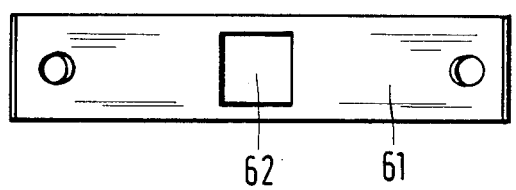
Figure 9:
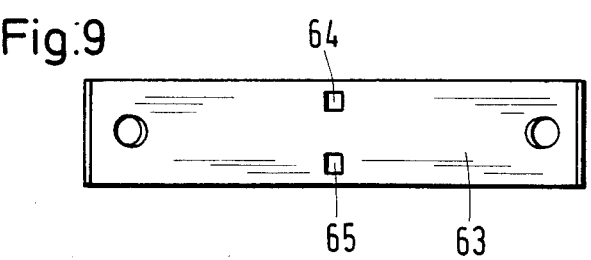

The bottom plate 49 can easily be detached and exchanged by means of two bolted joints 57 and 58 engaging in the side walls 53 and 54 of the ejector head 33. This has the advantage that various bottom plates, each representing individual fitting templates for various tasks, can be inserted, if the bucket wheels are also exchanged for various tasks. Larger grains require larger grain chambers 26, and also correspondingly fitting through-holes 25 and intake cones 27, and on the side of the ejector head suitably fitting outlet openings 48. Consequently, the bottom plate 59 in FIG. 7 corresponds to a medium outlet opening 60 of the template for medium grain; a bottom plate 61 in FIG. 8 having a larger outlet opening 62 is adapted for larger grain, such as for instance, maize. FIG. 9 shows a bottom plate 63 having two small parallel outlet openings 64, 65 intended for smaller grain, which can be made available on the bucket wheel at the distance of the outlet openings 64, 65 from the grain chambers in parallel rows. If the grain is even smaller, then even more of these rows can be provided, whereby it is one of the advantages of the new ejector that it thus allows individual grain seeding of small grain sizes, which conventionally are not manageable satisfactorily. In case of various template configurations, the side view of the bottom plate each time corresponds to the view of FIG. 6.

The shape of the outlet opening is also critical. The rectangular shape of the outlet opening is intended for building up the pressure in the through-hole 25 as fast as possible, whereby full passage is ensured in that the outlet opening corresponds approximately to the opening of the intake cone 27 to the through-hole 25. A short-term, full pressure build-up is of interest in order to effect the forceful release of the grain out of the grain chamber, on the one hand, and it is also advantageous, on the other hand, with respect to its short-term effect, so that the air cushion effect under the ejector head can be maintained as long as possible, and can be built up again as fast as possible.

At a change of the variety of seeds to be sown, it is thus possible to match the change with respect to the size and shape of the grain by changing the bucket wheel and the ejector template in order to adapt their outlet or outlets. Thereby, it is also possible to control the applied air pressure with the help of the gauge 42, and if necessary, to readjust it with the throttle valve 41. Thus a sowing apparatus equipped with a pneumatic ejection apparatus proves to be as versatile as easily convertible.

I claim:

1. Apparatus for separating and distributing granular goods comprising a housing means, a bucket wheel rotatable in said housing means, said bucket wheel having an outer receiving side and an inner side, said bucket wheel having a plurality of spaced-through holes extending between said inner side and said receiving side, intake means on said housing means for supplying said granular goods to said receiving side of said bucket wheel, discharge means on said housing for discharging said granular goods from said housing means, said discharge means being circumferentially spaced from said intake means, ejector means disposed within said bucket wheel and facing said inner side of said bucket wheel, conduit means supplying compressed air to said ejector means, said ejector means having a compressed air outlet directed toward said inner side of said bucket wheel such that the compressed air passing through said outlet acts on said through holes during rotation of said bucket wheel, said ejector means having an inner chamber to which said compressed air is fed, said ejector means having an outer face, said outer face having an outlet opening through which said compressed air passes such that the compressed air provides an air cushion effect between said ejector means and said inner face, whereby the ejector means floats on said air cushion.

2. Apparatus according to claim 1, wherein said apparatus is operable to sow single kernels.

3. Apparatus according to claim 1, wherein said bucket wheel has an inner chamber which is at least partially defined by said inner side, said ejector means being disposed in said inner chamber, said ejector means having an outer face with a configuration conforming generally to the configuration of a portion of said inner side.

4. Apparatus according to claim 3, wherein said inner side has an overall generally cylindrical configuration, said outer face of said ejector means having a partial cylindrical configuration.

5. Apparatus according to claim 1 further comprising mounting means for mounting said ejector means on said bucket wheel such that said ejector means is radially movable.

6. Apparatus according to claim 1, wherein said air cushion effect is provided between said outer face of the ejector means and said inner face of said bucket wheel.

7. Apparatus according to claim 1, wherein said conduit means has at least some portion thereof which is flexible.

8. Apparatus according to claim 1 further comprising adjustable throttle means on said conduit means.

9. Apparatus according to claim 1 further comprising pressure gauge means on said conduit means.

10. Apparatus according to claim 1, wherein said discharge means comprises an opening in a bottom portion of said housing means through which said granular goods pass out of said housing means to be sown.

11. Apparatus according to claim 1 further comprising conical recesses in said receiving side, each of said conical recesses leading to one of said through holes.

12. Apparatus according to claim 11 further comprising conical recesses in said inner side, each of said conical recesses leading to one of said through holes.

13. Apparatus according to claim 11, wherein said intake means comprises nozzle means directed toward said conical recesses so that a single kernel of granular product covers the respective through hole opening and other kernels are blown out of said conical recess by said nozzle means, such that the bucket wheel thereby feeds one kernel at a time from said intake means to said discharge means.

14. Apparatus according to claim 3, wherein said ejector means comprises an ejector body which has a hollow chamber for receiving air from said conduit means, said outer face of said ejector means and said ejector body constituting two separate structural members, and fastening means for detachably fastening said outer face to said ejector body.

15. Apparatus according to claim 1, wherein said ejector means is operable to discharge compressed air through said through hole in said bucket wheel to thereby discharge any granular goods which might have become stuck in the bucket wheel, said ejector means being disposed radially inwardly of said discharge means to provide for successive discharge of granular goods as said bucket wheel rotates past said ejector means and said discharge means.

16. Apparatus for separating and distributing granular goods comprising a housing means, a bucket wheel rotatable in said housing means, said bucket wheel having an outer receiving side and an inner side, said bucket wheel having a plurality of spaced-through holes extending between said inner side and said receiving side, intake means on said housing means for supplying said granular goods to said receiving side of said bucket wheel, discharge means on said housing for discharging said granular goods from said housing means, said discharge means being circumferentially spaced from said intake means, ejector means disposed within said bucket wheel and facing said inner side of said bucket wheel, conduit means supplying compressed air to said ejector means, said ejector means having a compressed air outlet directed toward said inner side of said bucket wheel such that the compressed air passing through said outlet acts on said through holes during rotation of said bucket wheel, mounting means for mounting said ejector means on said bucket wheel such that said ejector means is radially movable, and air cushion means utilizing said compressed air for providing an air cushion effect between said ejector means and said inner face.

17. Apparatus according to claim 16 further comprising mounting means for mounting said ejector means on said bucket wheel such that said ejector means is radially movable, said mounting means allowing said ejector means to move radially outwardly to a position in close proximity to said inner face while precluding contact with said inner face.

* * * * *